US005933958A

United States Patent [19]

Shamblin

[11] Patent Number: 5,933,958

[45] Date of Patent: Aug. 10, 1999

[54] GANTRY PRESS HEIGHT ADJUSTMENT METHOD

[75] Inventor: Wayne A. Shamblin, Ft. Worth, Tex.

[73] Assignee: Alpine Engineered Products, Inc., Pompano Beach, Fla.

[21] Appl. No.: 09/051,322

[22] PCT Filed: Oct. 18, 1996

[86] PCT No.: PCT/US96/16744

§ 371 Date: Apr. 9, 1998

§ 102(e) Date: Apr. 9, 1998

[87] PCT Pub. No.: WO97/16280

PCT Pub. Date: May 9, 1997

Related U.S. Application Data

[63] Continuation of application No. 08/552,194, Nov. 2, 1995, Pat. No. 5,768,769.

[51] Int. Cl.[6] ..... B23P 11/00

[52] U.S. Cl. ..... 29/897.31; 29/432; 29/798; 100/210

[58] Field of Search ..... 29/432, 798, 897.31, 29/407.09; 100/210, 913; 227/152; 269/910

[56] References Cited

U.S. PATENT DOCUMENTS

| | | | |
|---|---|---|---|
| 2,811,186 | 10/1957 | Honza | 269/910 |
| 3,036,609 | 5/1962 | Quesenberry | 269/910 |
| 3,195,449 | 7/1965 | Jureit | 227/152 |
| 3,212,694 | 10/1965 | Sanford | 227/152 |
| 3,255,943 | 6/1966 | Sanford | 227/152 |
| 3,336,865 | 8/1967 | Brand | 100/210 |
| 3,413,703 | 12/1968 | Sanford | 29/155 |
| 3,538,843 | 11/1970 | Lubin | 100/53 |
| 3,667,379 | 6/1972 | Templin | 227/152 |
| 3,855,917 | 12/1974 | Farrell et al. | 100/35 |
| 3,925,870 | 12/1975 | Adams | 29/897.31 |
| 4,295,269 | 10/1981 | Wright | 29/278 |
| 4,437,234 | 3/1984 | Thornton | 29/798 |
| 4,660,815 | 4/1987 | Rosser . | |
| 4,943,038 | 7/1990 | Harnden . | |
| 5,085,414 | 2/1992 | Weaver . | |
| 5,092,028 | 3/1992 | Harnden | 29/709 |
| 5,111,861 | 5/1992 | Gore et al. | 100/913 |
| 5,211,108 | 5/1993 | Gore et al. | 100/48 |
| 5,285,720 | 2/1994 | Wright . | |
| 5,553,375 | 9/1996 | Powers | 291/798 |

OTHER PUBLICATIONS

Product Brochure—*Roof Truss Gantry System*, Klaisler Mfg. Corp., date unknown.

Product Brochure—*Roller Gantry, Roller Press System*, MiTek Industries, Inc., date unknown.

Product Brochure—*Gantry Roller, C.M.F., Inc.*, date unknown.

Product Brochure—*Fabrication & Cutting Equipment for Truss Manufacturing*, MiTek Industries Group of Companies, 1988.

Product Brochure—*Mark–8–Press, Truss Fabrication Equipment*, MiTek Industries, Inc., 1988.

(List continued on next page.)

*Primary Examiner*—David P. Bryant
*Attorney, Agent, or Firm*—Crutsinger & Booth

[57] ABSTRACT

A gantry press adjustment apparatus for vertically adjusting a parallel gantry press (10) with respect to a work surface (77). The gantry press has a rigid frame with a first side frame portion (12) and a second side frame portion (14), and a press roller (16) mounted therebetween. Each side frame portion has first and second generally parallel vertical members (28, 30). The adjustment apparatus has first and second planar members (40) which are adapted to receive and support the axle (60) of the press roller. The planar members are slidably mounted along a vertical axis of the frame portions. First vertical adjustment members (100, 200) are connected to the first side frame portion and to the first planar member, and second vertical adjustment members (300, 400) are connected to the second side frame portion and to the second planar member. A drive (134) is connected with each of the adjustment members to adjust each member at a substantially equivalent rate.

5 Claims, 3 Drawing Sheets

OTHER PUBLICATIONS

Product Brochure—*Floor Roller, Ultra High–Speed Floor Truss Machine*, MiTek Industries, Inc., 1988.

Product Brochure—*Mark V, Fully Automatic Moving Press System*, MiTek Industries, Inc., 1988.

Product Brochure—*Gantry, For Large Trusses and Long Production Runs*, MiTek Industries, Inc., 1991.

Product Brochure—*Super Torque Gantry System*, source unknown.

Product Brochure—*Other Features of the Trussmaker*, Tee Lock Corporation, date unknown.

Product Brochure—*Super Torque Gantry System*, source unknown.

GANTRY PRESS HEIGHT ADJUSTMENT METHOD

This application is a 371 of PCT/US96/16744, filed Oct. 18, 1996, and a continuation of 08/552,194, filed Nov. 2, 1995, now U.S. Pat. No. 5,768,769.

TECHNICAL FIELD

This invention relates to the fabrication of wooden structures on a work surface. More particularly, the present invention relates to a gantry press with a parallel roller press with vertical adjustment.

BACKGROUND OF THE INVENTION

Gantry presses have been used in the assembly of trusses used in a variety of applications. Typically, trusses are constructed on a work surface using a truss template. The work surface is typically composed of wooden or plastic panel materials. Typically a series of top and bottom connector plates are used to assemble chord and web members together in a truss assembly. A gantry press can be used to embed the connector plates into the truss members to assemble the truss.

The gantry press enables a manufacturer to decrease the time required to construct a truss. However, with repeated uses, the work surface compresses, increasing the distance between the work surface and the roller press, limiting the effectiveness of the roller press to embed the connector plates into the members. When the panels forming the work surface are changed, replaced or compressed by the roller press, the distance between work surface distance changes.

At times wooden members used in the truss assembly are harder or denser than usual. Embedding the connector plates in the denser materials requires that the vertical adjustment of the gantry press with respect to the work surface would have to be altered along the length of the roller press to account for the variation in density between soft materials and denser materials. In the case of harder woods or denser materials, the roller press must be changed to account for the increased amount of pressure caused by the resistance of the connector plates to embed in the truss members.

The conventional method to adjust the parallel roller requires a workman to manually adjust each side of the gantry press and check for proper spacing and parallel orientation with the work surface to acquire the proper vertical adjustment. In prior gantry presses, a nut and bolt rod assembly is connected to the roller press to allow for vertical adjustment where each side of the roller press would be manually and individually adjusted. An example of such adjustment apparatus is shown in U.S. Pat. No. 3,855,917 issued to Farrell et al. If the roller press spacing needs to be lowered, gauge blocks are placed between the work surface and the roller press. The roller press would then be lowered on each side until the roller press encountered the gauge blocks. If the roller press is to be raised, then a different gauge block designating the desired depth is placed between the work surface and the roller press. Again, the workman would manually lower each side of the roller press to the proper depth, and the press is verified to be in a parallel orientation with the work surface for proper operation of the gantry press.

Present gantry presses enable the roller press to disengage the truss assembly by vertically raising the roller press. For example, U.S. Pat. No. 5,211,108 issued to Gore et al. discloses an apparatus for selectively raising and lowering the roller press in a gantry press. To reduce the cycle time between successive operations, the roller press is automatically raised when the gantry press has stooped so that the completed truss can be discharged, eliminating the need for a side discharge table and to eliminate the need to initiate a manual lifting operation of the roller press to remove the truss.

Thus, a need exists for a gantry press with a vertically adjustable roller press which can be readily lowered or raised a discrete amount in a parallel fashion with a work surface and then used to complete assembly of the truss. Such a device would reduce labor costs and decrease the amount of setup time needed to place the gantry press into a proper configuration.

SUMMARY OF THE INVENTION

A gantry press adjustment apparatus for adjusting a vertical orientation of a parallel gantry press with respect to a work surface. The gantry press has a rigid frame with a first side frame portion and a second side frame portion. Each side frame portion has first and second generally parallel vertical members. The first and the second side frame portions are spaced sufficiently apart to accept and support a roller press therebetween. The adjustment apparatus has a first and second planar support members which are adapted to receive the axle of the roller press. The planar members are slidably mounted along a vertical axis of the frame portions. At least one vertical adjustment member is connected to the first side frame portion and to the first planar member. At least one vertical adjustment member is connected to the second side frame portion and to the second planar member. A drive is operatively connects each of the adjustment members to adjust each member at a substantially equivalent rate and vertical spatial orientation such that the planar members maintain the roller press in a parallel orientation with respect to the work surface.

The roller press can be moved from a first vertical position to a second vertical position by adjusting the vertical adjustment members. The vertical distance from the roller press to the work surface can be either increased or decreased depending on the materials being assembled on the work surface. While in the second position, the roller press provides a generally downward force against a truss assembly positioned on the work surface.

These and other features, advantages, and objects of the present invention will be apparent to those skilled in the art upon reading the following detailed description of preferred embodiments and referring to the drawing.

BRIEF DESCRIPTION OF THE DRAWING

The accompanying drawing is incorporated into and forms a part of the specification to illustrate several examples of the present invention. The figures of the drawing together with the description serve to explain the principles of the invention. The drawing is only for the purpose of illustrating preferred and alternative examples of how the invention can be made and used and is not to be construed as limiting the invention to only the illustrated and described examples. The various advantages and features of the present invention will be apparent from a consideration of the drawing in which.

DETAILED DESCRIPTION OF PREFERRED EMBODIMENT

Figure 1:
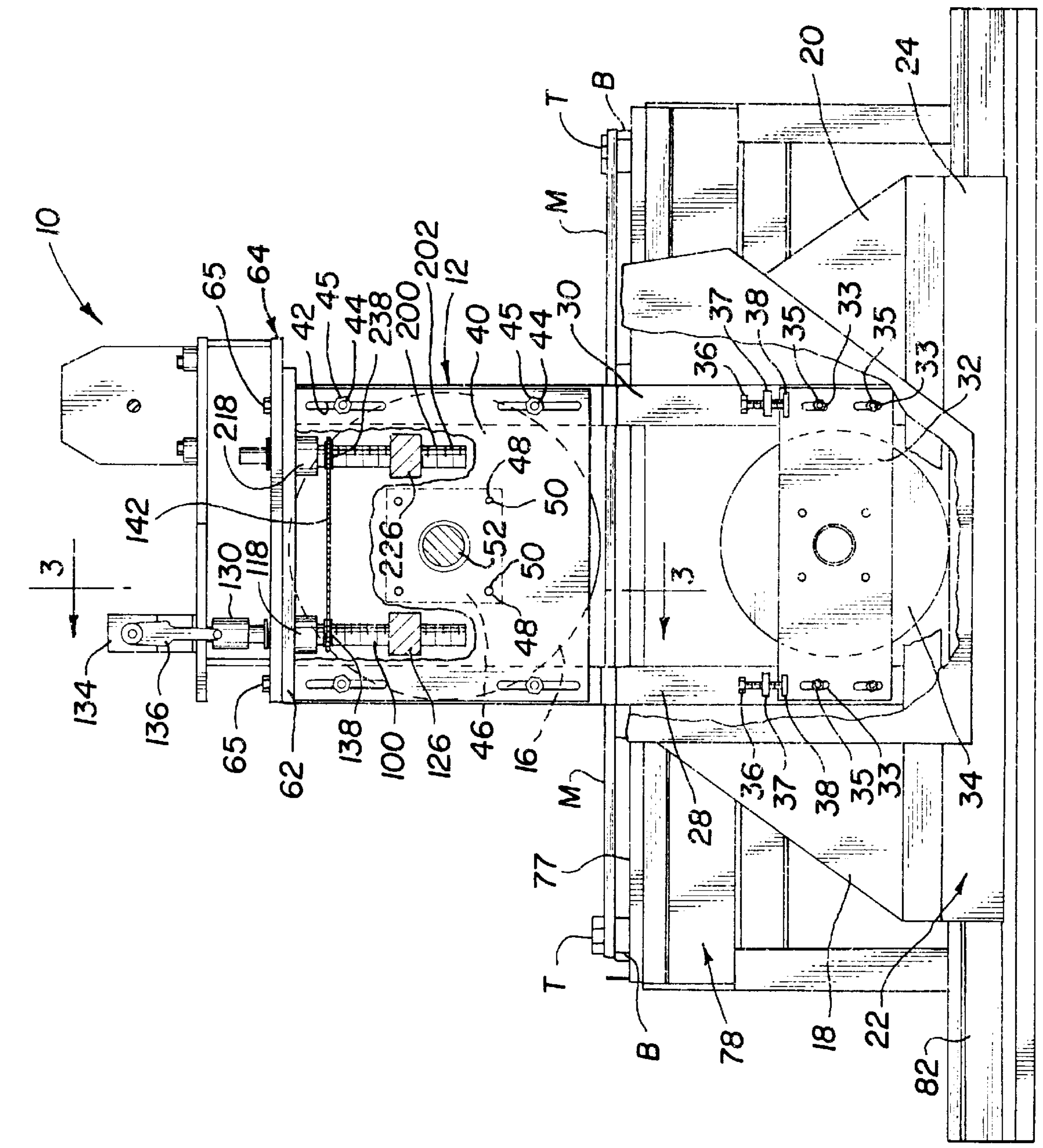
FIG. 1 is an elevational side view of an adjustable parallel gantry press of the present invention with portions cut out to expose the locomotion members on a track and the vertical adjustment members.
Figure 2:
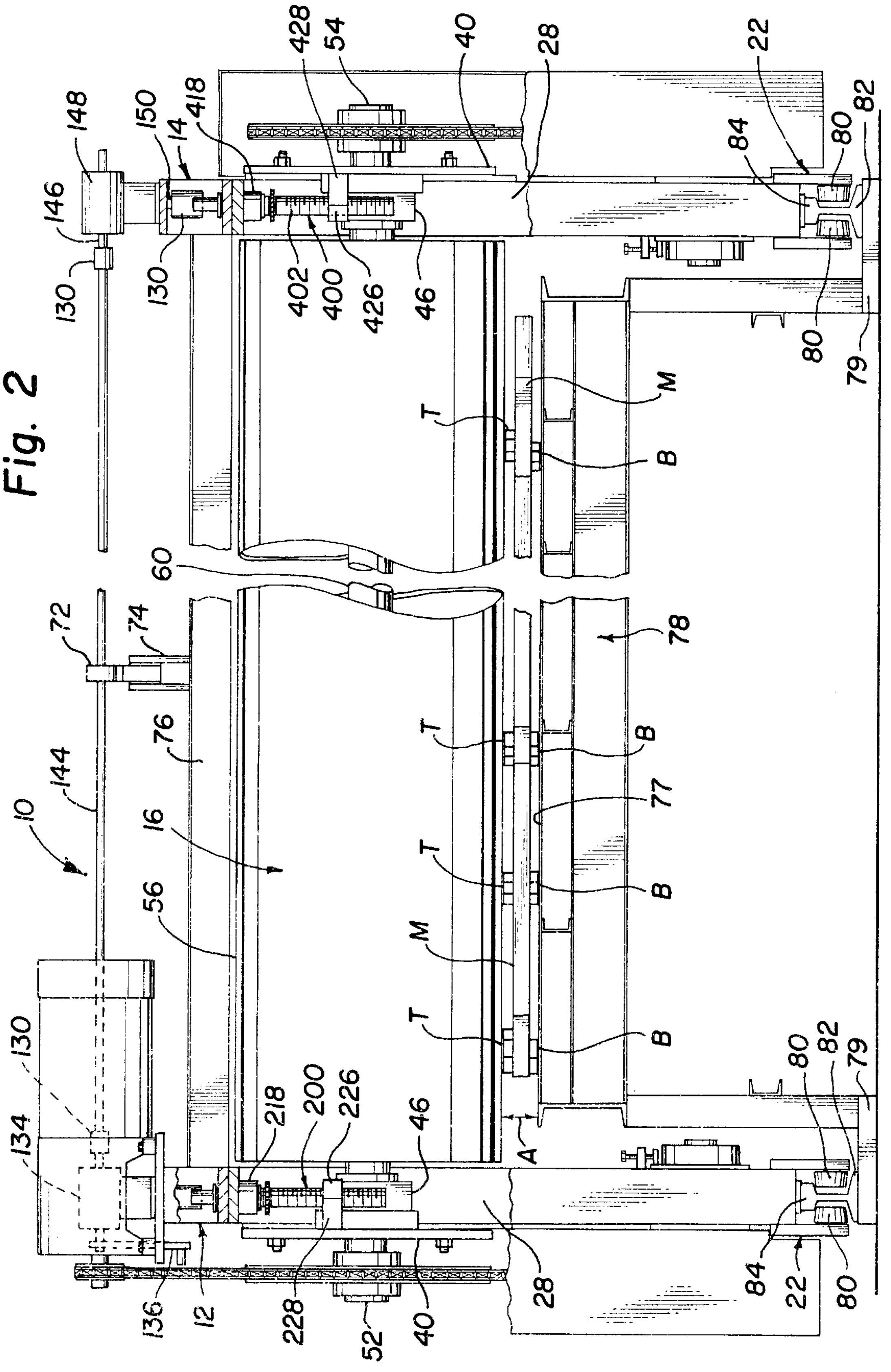
FIG. 2 is an elevational front view of the adjustable parallel gantry press.

Referring now to the drawing where like reference characters are used through the figures to refer to like parts, there is shown in FIGS. 1 and 2 a gantry press generally designated by the numeral 10. Omitted from the drawing for clarity is a drive motor and associated sprockets for propelling the gantry press along the substantially parallel tracks extending along the length of a work surface. Such drive mechanisms are well known in the art, for example see such a drive mechanism disclosed in U.S. Pat. No. 3,212,694 issued to Sanford, incorporated herein by reference.

Referring to FIG. 2, gantry press 10 has a first dolly 12, a second dolly 14 and a roller press 16 mounted and supported between first and second dollies 12 and 14, respectively. The gantry press is drivable along tracks 82 extending in a substantially parallel fashion along the length of work table 78.

The dollies 12 and 14 have a modified A-frame appearance as best shown in FIG. 1. Shown in FIG. 1 is first dolly 12. Second dolly 14 is as mirror image of first dolly 12, therefore, the detailed description of first dolly 12 equally applies to the description of second dolly 14.

As shown, first dolly 12 has an upwardly convergent lower side housing members 18 and 20, respectively. The lower extremities of side housing members 18 and 20, respectively, are attached to base brace 22 through flange portions 24 with a plurality of bolts therethrough.

Extending upwardly from base brace 22 are a pair of spaced apart, substantially parallel members 28 and 30. A drive wheel plate 32 with a drive wheel 34 is slidably mounted onto parallel members 28 and 30 through slots 33 defined in plate 32 and thru-bolts 35 extending through parallel members 28 and 30. Nuts are threadingly received on thru-bolts 35 to secure plate 32 to parallel members 28 and 30. Drive wheel adjustment screws 36 are threaded through receiving blocks 37 and attached to drive wheel plate 32 through blocks 38. Blocks 38 are attached to drive wheel plate 32 through welding or other attachment methods.

A roller press plate 40 is slidably mounted onto parallel members 28 and 30 through slots 42 defined in roller press plate 40 and thru-bolts 44 extending from parallel members 28 and 30. Nuts or other securing devices are threadingly received on threaded thru-bolts 44 to slidably secure press plate 40 to parallel members 28 and 30. Bearing block 46 is attached to roller press plate 40 with bolts 48 and apertures 50 extending therethrough.

Referring to FIG. 2, roller press 16 has stub shaft portions 52 and 54 which extend outwardly from the axial ends of roller press 16 and are rotatably journaled in bearing blocks 46 mounted on press plates 40 of dollies 12 and 14, respectively. Roller press 16 may be formed of a hollow steel skin 56 of three-fourths inch thickness which is internally strengthened or supported by transversely spaced disks at about two-foot spacing mounted on a four-inch diameter steel shaft 60, and may be, for example, eighteen-inches in diameter.

Referring back to FIG. 1, upper brace 62 and cap member 64 extends between the upper extremities of parallel members 28 and 30. Upper brace 62 and cap member 64 can be secured to parallel members 28 and 30 with bolts 65 received in threaded apertures or other securing methods.

As shown in FIG. 1, two vertical adjustment assemblies, generally designated by the numeral 100 and 200, respectively, are implemented in first dolly 12. Vertical adjustment assemblies 300 and 400 are implemented in second dolly 14. Each assembly is alike with the equivalent parts. For clarity and simplicity identical parts where shown begin with the numerical prefix of the assembly. Vertical adjustment assemblies 100, 200, 300 and 400 allows a generally simultaneous four-point adjustment of each side of roller press 16 and along the length of roller press 16 with minimum effort and setup time.

Figure 3:
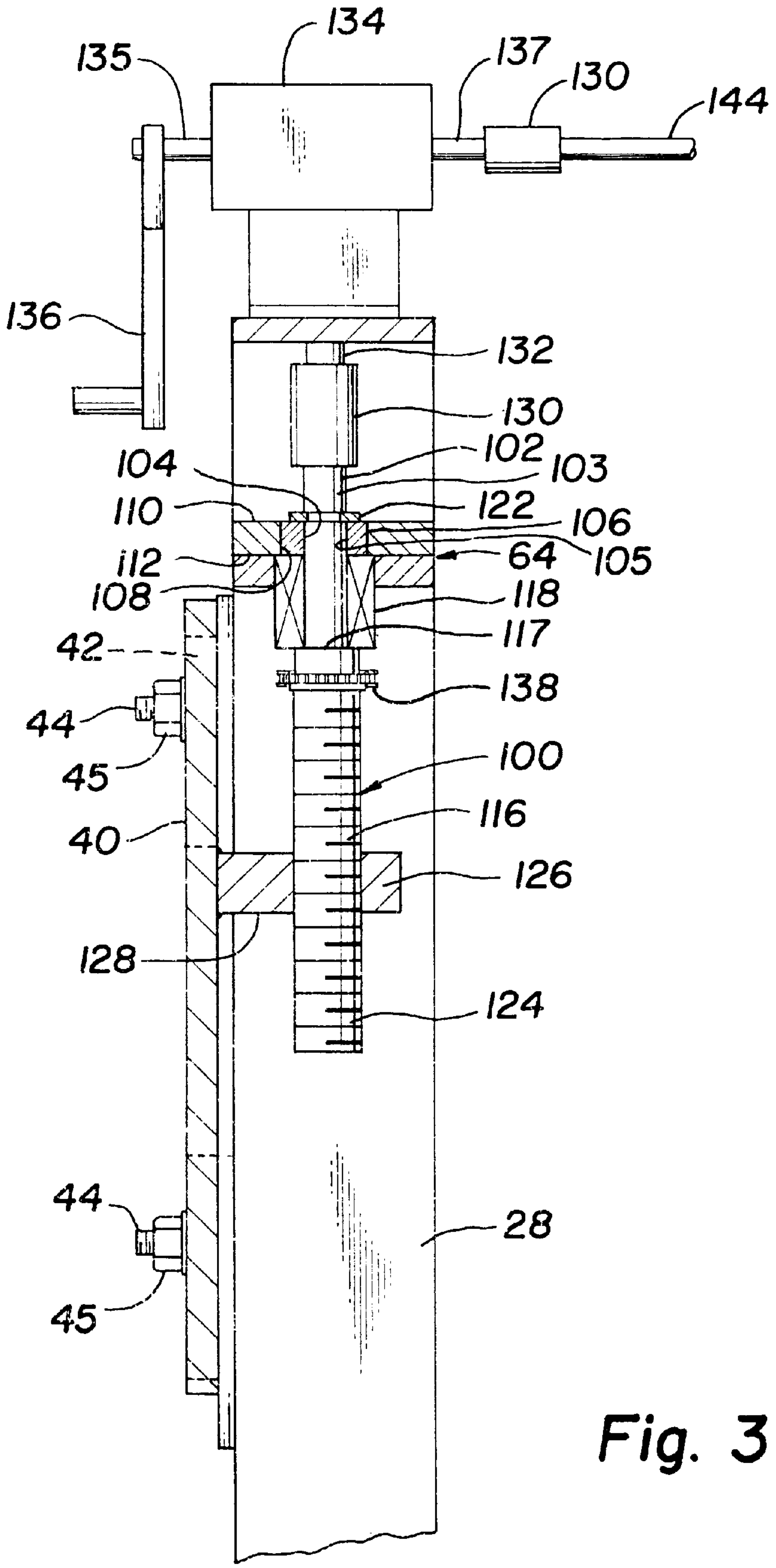
FIG. 3 is an enlarged partial cross-sectional view taken along line 3—3 of FIG. 1.

Referring to FIG. 3, shown is a cross-sectional detail of vertical adjustment assembly 100. Shown is shaft 102 having a first portion 103 extending through an aperture 104 defined by an inner surface 105 of substantially concentric collar member 106. Collar member 106 extends through collar aperture 108 defined in cap member 64. Collar member 106 is of a sufficient length to match the upper surface face 110 and the bottom surface face 112 of cap member 64 such that collar 106 nests within collar aperture 108.

A second portion 116 of shaft 102 has a larger circumference than first portion 103, forming shoulder 117 between first portion 103 and second portion 116. Thrust bearing 118 is supported by shoulder 117 through drive sprocket 138 and the first portion 103 of shaft 102 extends through thrust bearing 118 and drive sprocket 138. Groove 120 in first portion 103 accepts snap ring 122 to secure assembly 100 in position through aperture 108 defined in upper brace 62 and cap member 64. Second portion 116 of rod 102 has external threads 124 which are received in threaded member 126. Threaded member 126 is integrally formed with block 128 which is secured to roller press plate 40 with bolts, welding, or other securing devices. When shaft 102 is rotated, the external threads on portion 116 and the internal threads of member 126 are in threaded engagement and readily feed shaft 102 through threaded member 126 thereby raising or lowering roller press 16 with respect to the frame of dollies 12 and 14, respectively. The threaded surfaces on portion 116 and member 126 each have a screw ratio sufficient to minimize the torsional force exerted on shaft 102 and to minimize the amount of rotational force that must be exerted on input shaft 135 of right angle gearbox drive 134, thereby readily adjusting the vertical height of massive roller press 16. After the height is set, plates 40 are locked in place by nuts 45 tightened against plates 40 on thru-bolts 44.

Shaft 102 is connected through coupler 130 to gearbox drive shaft 132 extending from right angle gearbox drive 134. Drive 134 can either be manually operable with hand crank 136 or with a motor (not shown) attached to input shaft 135 of gearbox drive 134.

A drive sprocket 138 is keyed with second portion 116 of shaft 102 such that drive sprocket 138 rotates with shaft 102. Referring to FIG. 1, drive sprocket 138 is interconnected with second sprocket 238 through sprocket drive chain 142. Sprockets 138 and 238 have substantially similar dimensions so that the torsional force applied to shaft 102 is also imparted to second shaft 202 of second vertical adjustment assembly 200 through chain 142, causing the uniform rate of displacement of roller press plate 40 on each side of parallel members 28 and 30, respectively.

Referring to FIGS. 2 and 3, a first end of rod linkage 144 is connected through coupler 130 to second output shaft 137 of right angle gearbox drive 134. A second end of rod linkage 144 is connected through another coupler 130 to first drive shaft 146 of second right angle gearbox drive 148. Second drive shaft 150 is connected through coupler 130 to a vertical shaft (not shown) of the third vertical adjustment assembly (not shown). Rod 144 is inserted through a plurality of rod bearings 72 which act to support the rod. The rod bearings are connected through bearing support 74 to transverse bracing member 76. Bracing member 76 interconnects and braces first dolly 12 with second dolly 14 of gantry press 10.

Referring to FIG. 2, parallel gantry press 10 is initially configured such that roller press 16 is substantially parallel with the plane defined by work surface 77 of table 78. The initial parallel configuration is a calibration procedure in which the roller press 16 is lowered to the work surface sufficient to determine the parallel posture of roller press 16 with work surface 77. If a plane formed by the bottom circumferential arc of the roller press is not aligned with the planar reference provided by work surface 77, rod linkage 144 is disconnected from first right angle gearbox drive 134 and second right angle gearbox drive 148 of both dollies 12 and 14 that each stub shaft 52 and 54, respectively, can be vertically adjusted. Plates 40 are manually adjusted by actuating first and second right angle gearbox drives, respectively, until roller press 16 comes into a parallel orientation with work surface 77. After alignment is obtained, rod linkage 144 is reconnected to first and second gearbox drives 134 and 148, respectively, so that the vertical position of roller press 16 can be readily adjusted by raising or lowering plates 40 as discussed earlier. Gantry press 10 can be employed by drivingly engaging drive wheel 34 against top surface of track 82 using a drive motor and sprocket configuration such as is shown in U.S. Pat. No. 3,212,694, for example.

Dollies 12 and 14, respectively, are movably mounted on track 82 through a plurality of bogie wheels 80. Track 18 extends the length of a work station or table 78. Bogie wheels 80 are rotatably connected to base brace 22 drivingly engage track 82 having dual rail surfaces. Track 82 is attached to table 78 through connecting member 79. Other various shades and phases of connection may be used to arrange gantry press 10 and table 78 within the same frame of reference. For example, both table 78 and track 82 can be physically attached to a floor surface.

The dual rail surface of each track 82 provides a vertically restrictive barrier through the engagement of bogie wheels 80 with flared portion 84 of track 82 as gantry press 10 applies a downward pressure to a truss assembled across work surface 77. The truss as shown is a top connector plate T, a series of truss chord and web members M, and a bottom connector plate B. These portions of the truss assembly are placed within a selected template depicted on work surface 77. An example of setting-up a truss assembly is shown in greater detail in U.S. Pat. No. 3,212,594.

Gantry press 10 is driven along track 82 through drive wheel 34 of each dolly 12 and 14, respectively. As roller press 16 engages the truss assembly, a downward pressure is applied against the truss assembly. Simultaneous with the application of the downward pressure, thrust bearing 118 of first vertical adjustment assembly 100 (see FIG. 1), and thrust bearings 218, 318 and 418 of the second, third and fourth vertical adjustment assemblies, respectively, an upward pressure is applied against a bottom surface of upper brace 62 of first and second dollies 12 and 14, accordingly. A constant force is effected in a downward manner against the truss positioned on the work surface while maintaining a vertical adjustment configuration which can readily allow parallel vertical adjustment of roller press 16 with respect to work surface 77 when desired. The truss components comprising top and bottom connector plates T and B, respectively, and truss members M, are driven together with force sufficient to maintain the truss assembly in an assembled form.

The truss assembly is then removed from work surface 77. Typically, the assembly is passed through a fixed press such as a stationary roller press (not shown) to firmly connect the truss assembly into a unit.

With repeated usage, work surface 77 compresses, causing distance A between work surface 77 and roller press 16 to enlarge. Unless the distance is corrected, the effectiveness of gantry press 10 is adversely affected. Also, distance A must be changed accordingly when denser woods or materials other than the materials used in a preceding truss assembly are used for the truss chord and web members M.

To adjust the vertical position of roller press 16, right angle gearbox drive 134 is activated by turning crank 136. In response, shaft 102 rotates according to the direction of the crank, causing threads 124 of shaft 102 to engage the threaded member 126 to move along the length of second portion 116 of shaft 102. The movement of threaded portion 116 causes plate 40 to travel in a vertical direction, thereby vertically moving press roller 16 through the connection of stub shaft 52 with plate 40. With the rotation of each rod of each vertical assembly, plates 40 of dollies 12 and 14 and journaled stub shafts 52 and 54, respectively, of the roller press 16 are raised or lowered in each dolly 12 and 14, accordingly.

Concurrently, shaft 202 of second vertical adjustment assembly 200 is rotated via sprocket drive chain 142 engaging sprocket 238 mounted on shaft 202. The same apparatus is employed in second dolly 14 with respect to the third and the fourth vertical adjustment assemblies.

Rod 144, connected to second right angle gearbox drive 148, conveys the mechanical energy from gearbox drive 134 and crank 136 to second gearbox drive 148. As discussed above, the second gearbox drive similarly adjusts plate 40 of second dolly 14 concurrently with adjustment of plate 40 of first dolly 12. In this fashion, roller press 16 is vertically adjusted in a substantially parallel fashion, with the need of tediously adjusting individual bolts and nuts as shown in prior devices.

The description and figures of the specific example above does not point out what an infringement of this invention would be, but are to provide at least one explanation of how to make and use the invention. Numerous modifications and variations of the preferred embodiments can be made without departing from the scope and spirit of the invention. Thus, the limits of the invention and the bounds of the patent protection are measured by and defined in the following claims.

What is claimed is:

1. A method of adjusting a vertical spacing and parallel orientation of a roller press with respect to a work surface of a truss assembly table for use in assembling a truss, the method comprising the steps of:

(a) supporting the first and second ends of a roller press on journaled bearings mounted on first and second roller press plates, respectively;

(b) supporting each of the first and second roller press plates for vertical adjustment along two parallel vertical adjustments on each of the first and second dollies, respectively, (c) mechanically interconnecting the four vertical adjustments for simultaneous four-point adjustment of the first and second roller press plates;

(d) simultaneously adjusting the vertical position of the four vertical adjustments to adjust the vertical spacing between the roller press and the work surface, whereby the roller press is maintained in parallel orientation with respect to the work surface; and (e) mounting the first and second dollies on parallel tracks, whereby the roller press can be moved over the work surface.

2. The method according to claim 1, wherein the four vertical adjustments comprise: means for vertically adjusting the first and second roller press plates.

3. The method according to claim 1, wherein each of the four vertical adjustments comprises:

a rod having a shoulder surface between a first portion and a second portion of the rod, the second portion having a threaded surface and a diameter larger than the first portion of the rod;

a threaded member adapted to threadingly receive the second portion of the rod, the threaded member having mounting means to attach the threaded member to one of the roller press plates; and a thrust bearing about the first portion of the rod supported by the shoulder surface, the first portion of the rod extending through an aperture defined in a top brace of a dolly, the aperture being adapted to rotatingly receive the first portion of the rod, the thrust bearing having an outer circumference larger than the aperture.

4. The method according to claim 1, wherein the step of simultaneously adjusting the vertical position of the four vertical adjustments comprises: operatively interconnecting a drive to each of the four vertical adjustments to adjust each at a substantially equivalent rate and vertical spatial orientation.

5. The method according to claim 1, further comprising the step of: moving the roller press over chord and web members positioned on the work surface for embedding connector plates therein and assembling a truss therefrom.

* * * * *

UNITED STATES PATENT AND TRADEMARK OFFICE

CERTIFICATE OF CORRECTION

PATENT NO. : 5,933,958

DATED : August 10, 1999

INVENTOR(S) : Wayne A. Shamblin

It is certified that error appears in the above-identified patent and that said Letters Patent is hereby corrected as shown below:

Column 1, line 19 after "Typically" insert a -- comma --;

Column 2, line 23 after "has" delete -- a --;

Column 2, line 31 after "drive" delete -- is --;

Column 4, line 6 after "simplicity" insert a -- comma --;

Column 4, line 8 change "allows" to -- allow --;

Signed and Sealed this

Twenty-ninth Day of February, 2000

Attest:

Q. TODD DICKINSON

*Attesting Officer* *Commissioner of Patents and Trademarks*